United States Patent [19]

Shikichi et al.

[11] Patent Number: 5,247,505
[45] Date of Patent: Sep. 21, 1993

[54] INFORMATION RECORDING METHOD FOR RECIPROCALLY RECORDING AND VERIFYING INFORMATION

[75] Inventors: Satoshi Shikichi; Fumiaki Kawaguchi, both of Tokyo; Kenichi Suzuki; Masayuki Usui, both of Yokohama; Hiroshi Matsuoka, Kawasaki; Kazuhiko Matsuoka; Hideki Hosoya, both of Yokohama; Akio Aoki, Tokyo; Masahiko Enari; Kazuo Minoura, both of Yokohama, all of Japan

[73] Assignee: Canon Kabushiki Kaisha, Tokyo, Japan

[21] Appl. No.: 983,627

[22] Filed: Dec. 4, 1992

Related U.S. Application Data

[63] Continuation of Ser. No. 718,924, Jun. 25, 1991, abandoned, which is a continuation of Ser. No. 427,918, Oct. 24, 1989, abandoned, which is a continuation of Ser. No. 850,830, Apr. 11, 1986, abandoned.

[30] Foreign Application Priority Data

Apr. 17, 1985 [JP] Japan .................. 60-81844
Apr. 21, 1985 [JP] Japan .................. 60-85260

[51] Int. Cl.$^5$ .............................................. G11B 7/00
[52] U.S. Cl. ........................... 369/54; 235/437; 235/480; 360/31; 360/53
[58] Field of Search ............. 369/44.27, 44.32, 53, 369/54; 360/2, 31, 53, 70; 371/13, 69.1; 235/380, 437, 438, 480

[56] References Cited

U.S. PATENT DOCUMENTS

| | | |
|---|---|---|
| 3,771,143 | 11/1973 | Taylor . |
| 3,795,902 | 3/1974 | Russell . |
| 3,918,027 | 11/1975 | Lechner . |
| 3,946,202 | 3/1976 | Taniguchi et al. .................. 235/380 |
| 4,167,023 | 9/1979 | Bessette et al. .................. 360/70 X |
| 4,308,612 | 12/1981 | Miyauchi et al. ................. 369/54 X |
| 4,309,721 | 1/1982 | Christopher ..................... 369/53 X |
| 4,355,318 | 10/1982 | Miyauchi ......................... 369/54 X |
| 4,480,274 | 10/1984 | Coleman, Jr. ..................... 360/31 |
| 4,485,451 | 11/1984 | Dyakov et al. ................... 360/31 X |
| 4,506,306 | 3/1985 | Veillard .......................... 360/53 X |
| 4,519,058 | 5/1985 | Tsurushima et al. ............. 369/54 X |
| 4,551,840 | 11/1985 | Fujii et al. ....................... 360/53 X |
| 4,554,654 | 11/1985 | Kato .................................. 369/54 |
| 4,571,716 | 2/1986 | Szerlip ............................. 369/58 X |
| 4,604,748 | 8/1986 | Sato .................................. 360/53 X |
| 4,611,314 | 9/1986 | Ogata et al. ...................... 369/32 |
| 4,641,310 | 2/1987 | Martens et al. ................... 371/13 X |

FOREIGN PATENT DOCUMENTS

| | | |
|---|---|---|
| 0131727 | 1/1985 | European Pat. Off. . |
| 2326942 | 12/1973 | Fed. Rep. of Germany . |
| 3124990 | 4/1982 | Fed. Rep. of Germany . |
| 2136614 | 9/1984 | United Kingdom . |

OTHER PUBLICATIONS

Funk-Technik 1972, No. 19, pp. 692-694.
Taschenbuch der Nachrichtenverarbeitung, by K. Steinbuch, Second Edition, 1967, p. 593.
Peripheral Devices by Ivan Flores, 1973, p. 289.
Lexikon der Datenverarbeitung by K. Zuse, 1969, pp. 644 and 645.
Patent Abstracts of Japan, vol. 3, No. 99 (E132), Aug. 22, 1979, p. 18E132, and JP 54-77119.

*Primary Examiner*—W. R. Young
*Attorney, Agent, or Firm*—Fitzpatrick, Cella, Harper and Scinto

[57] ABSTRACT

The information recording method of the present invention comprises steps of recording information on a recording medium by a recording head during forward movement, reading the information recorded during the forward movement in the opposite sequence to the recording sequence during backward movement, and checking if the information has been correctly written or not based on the information read during the backward movement.

4 Claims, 7 Drawing Sheets

INFORMATION RECORDING METHOD FOR RECIPROCALLY RECORDING AND VERIFYING INFORMATION

This application is a continuation of application Ser. No. 07/718,924 filed Jun. 25, 1991, now abandoned, which is a continuation of Ser. No. 07/427,918 filed Oct. 24, 1989, now abandoned, which is a continuation of Ser. No. 06/850,830 filed Apr. 11, 1986 now abandoned.

BACKGROUND OF THE INVENTION

The present invention relates to a recording method for verifying if information has been correctly recorded in an apparatus which records and reproduces information by a relative linear reciprocal movement between the recording and reproducing apparatus and a recording medium. Recently, information has been optically or magnetically recorded by relatively and linearly reciprocating a write unit of the recording and reproducing apparatus (hereinafter called a recording head) relative to a card-like recording medium. In this case, it is important to rapidly verify if the information has been correctly recorded after the write operation.

Figure 1:
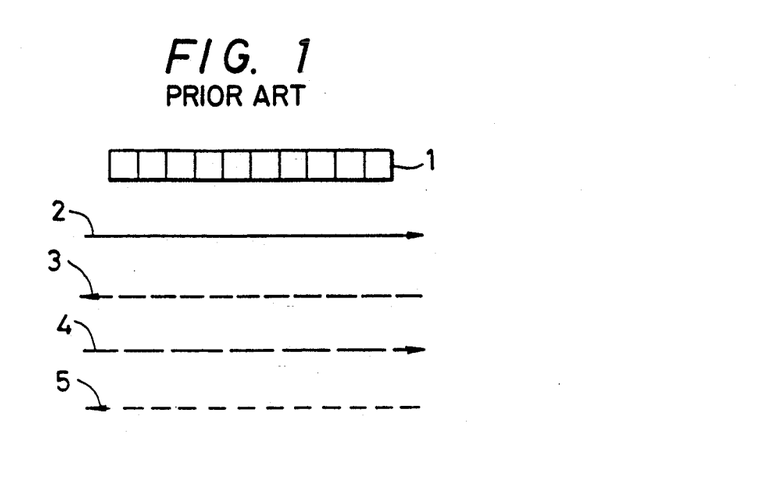
FIG. 1 illustrates an information recording method.

FIG. 1 shows a technique to verify if the information has been correctly recorded or not. Numeral 1 denotes an information track on a recording medium on which the information is to be recorded, numeral 2 represents a movement direction of a recording head relative to the recording medium in writing operation, and numeral 3 represents a movement direction of the recording head relative to the recording medium in a period between the writing operation and the information read operation for verifying the recorded information. When the recording head is moved in the direction 3, the writing operation and the reading operation are not performed. The head movement in this period is called an idling movement. Numeral 4 represents a relative movement direction of the recording head relative to the recording medium when the recorded information is verified, and numeral 5 represents a movement direction of the recording head relative to the recording medium when the recording head is returned to a home position in preparation for the next writing operation. In the writing operation which uses such a record check method, two times of relative movement between the recording head and the recording medium are required to record information on one information track and two times of idling movement are performed during the two times of reciprocal movement. Accordingly, recording and verification read times are long.

SUMMARY OF THE INVENTION

It is an object of the present invention to provide an information recording method which reads information recorded on a recording medium to verify it.

It is another object of the present invention to provide an information recording method which requires a short recording time in spite of verification reading.

The information recording method of the present invention comprises steps of recording information on a recording medium by a recording head during forward movement, reading the information recorded during the forward movement in the opposite sequence to the recording sequence during backward movement, and checking if the information has been correctly written or not, based on the information read during the backward movement.

In the information recording method of the present invention, when the information recording medium is made of an unrewritable medium and an information track has been determined to include information recorded incorrectly, an indicia indicating that the track has the information incorrectly recorded and need not be reproduced in a reproducing operation may be recorded on the recording medium. The indicia may be recorded on an extended line of the track on the recording medium. By recording such an indicia, it is immediately determined in the reproducing operation that the track need not be read.

In the information recording method of the present invention, there are various methods to verify if the information has been correctly recorded or not. In a first method, a data to be recorded and a data read from the recorded track are compared bit by bit. In a second method, an error check code such as a cyclic redundancy check code is added to an end of a data to be recorded and they are recorded on the recording medium, and in the verification step, an error is checked based on the reproduced data and the error check code. More specifically, a data $U(x)$ including a data to be recorded and an error check code is selected such that it is always divided by a generation polynomial $G(x)$ without residue. If there is no recording error, the data $U(x)$ reproduced from the recording medium can be divided by the generation polynomial $G(x)$ without residue, but if an error is included during recording operation, a data $U'(x)$ reproduced from the recording medium cannot be divided by $G(x)$ without residual. In this manner, any error during the recording operation can be detected. In a third method, an error correction code such as Reed-Solomon code is added to the data to be recorded and they are recorded, and in the verification step, an error is corrected based on the read data and the error correction code, and an error flag for indicating whether the correction was made or not is set. If an error which is beyond the correction ability is included in the recording operation, the error flag indicates that the correction was not made so that incorrect recording is indicated. In the following description of an embodiment, the first method is described.

BRIEF DESCRIPTION OF THE DRAWINGS

FIG. 3B' is a flowchart of the operation of the apparatus shown in FIG. 3A and specifically of the operation of CPU 11 with respect to information tracks 21 and 22.

DESCRIPTION OF THE PREFERRED EMBODIMENTS

Figure 2:
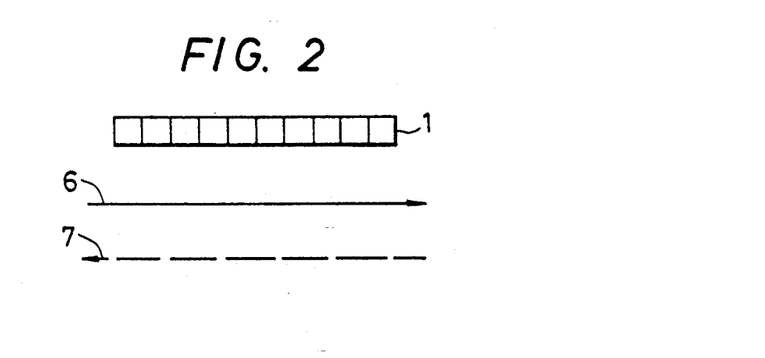
FIG. 2 illustrates an information recording method of the present invention.

FIG. 2 illustrates a method of the present invention. Numeral 1 denotes an information track, numeral 6 represents a movement direction of a recording head relative to a recording medium during a recording operation, and numeral 7 represents a movement direction of the recording head relative to the recording medium during a verification operation. As shown in FIG. 2, since the verification reading operation is performed immediately after the recording operation, a signal is read out on the opposite time axis to that of the recording operation, and the recording and the verification are performed in one time of reciprocation of the recording head. Accordingly, the idling movement time of the head is saved and the recording and verification times can be reduced.

The signal read out in the verification operation is of the opposite sequence to that of the signal applied to the recording head during the recording operation. Accordingly, it is advisable to read out the signal from memory means in the opposite sequence to the signal sequence applied in the recording operation, when the reproduced signal is compared with the recording signal during the verification operation.

In general, it is advisable that the signal is read from the information track of the recording medium in the verification operation such that the reproduced signal can be used as it is. If the signal is read from the memory means in the opposite sequence on the time axis and it is recorded, the signal read during the verification operation can be used without reversing the sequence.

Figure 3A:
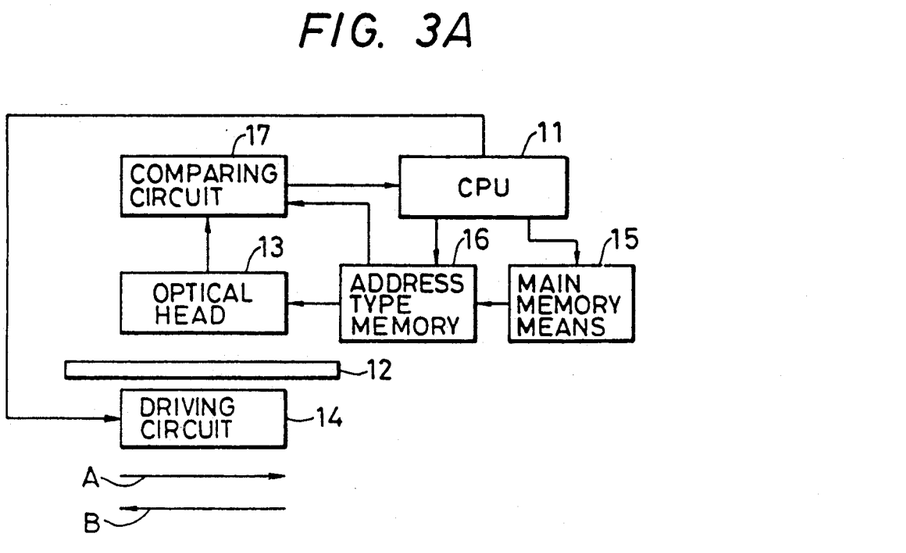
FIG. 3A shows an embodiment of an optical information recording and reproducing apparatus in accordance with the present invention.
Figure 3B:
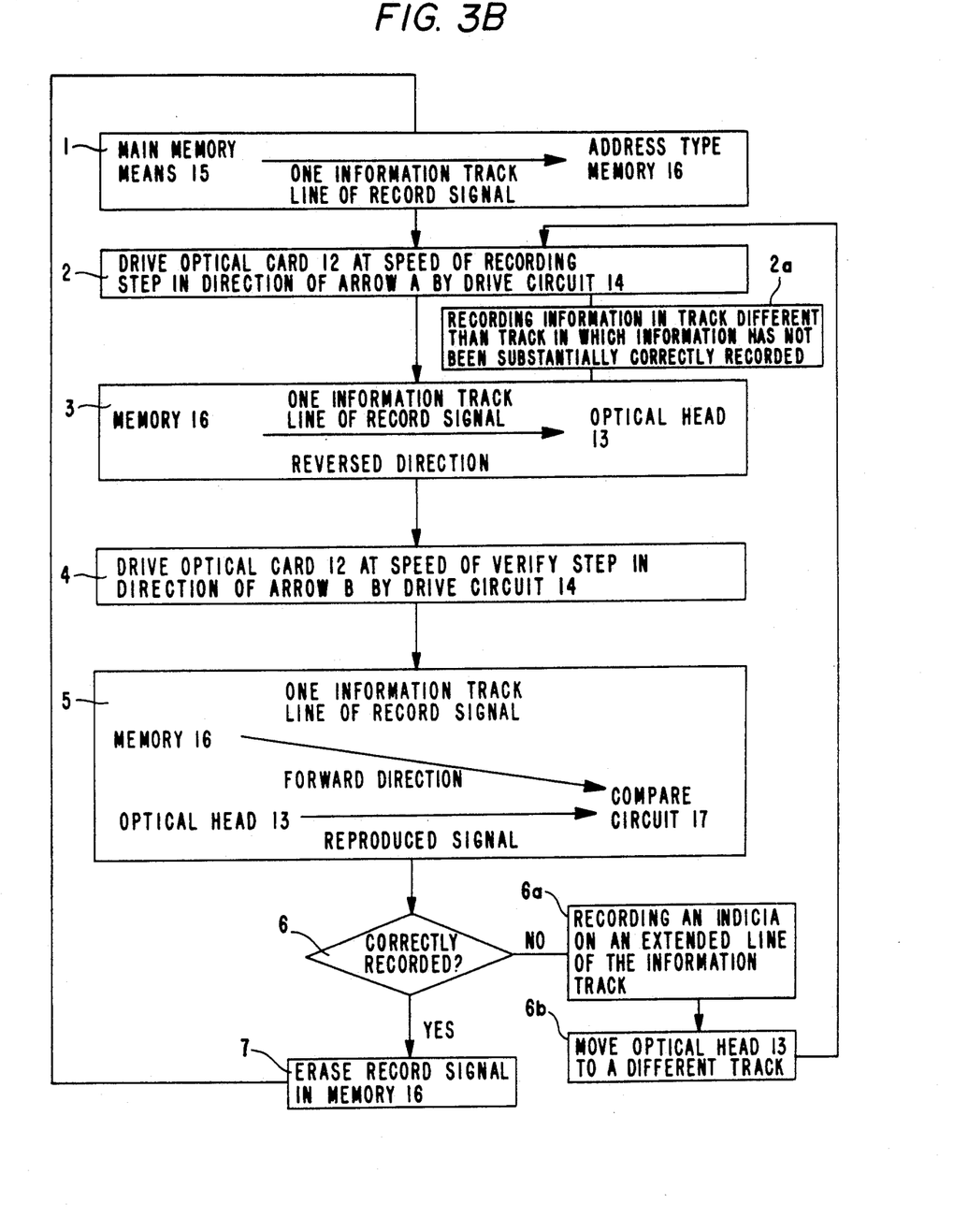
FIG. 3B is a flowchart of the apparatus as shown in FIG. 3A and the operation illustrated in FIG. 3B is controlled by the operation of the CPU 11 depicted in FIG. 3A.

FIG. 3A shows one embodiment of an optical information recording and reproducing apparatus in accordance with the present invention. Numeral 11 denotes a central processing unit (CPU) which controls an overall operation of the recording and reproducing apparatus as shown in the flowchart of FIG. 3B. Numeral 12 denotes a card-like optical recording medium (optical card), numeral 13 denotes an optical head for irradiating a light beam to the optical card 12 to optically record and reproduce information, numeral 14 denotes drive means for reciprocating a shuttle unit (not shown) on which the optical card 12 is mounted in the direction of arrows A and B, numeral 15 denotes main memory means which stores information to be written into the optical card 12 such as a personal computer, and numeral 16 denotes an address type memory which can store one information track line of record signal. The signals stored in the memory 16 can be read either forwardly or backwardly. Numeral 17 denotes a compare circuit.

In a recording operation, one information track line of record signal is sent from the main memory means 15 to the address type memory 16 and stored therein in response to an instruction from the CPU 11 as shown in Block 1 of FIG. 3B. Then, the one line of record signal is backwardly read from the memory 16 by a signal from the CPU 11 as shown in Block 3 of FIG. 3B. Thus, the signal which is reversed on a time axis is applied to the optical head 13 to intensity-modulate a semiconductor laser light source (not shown) of the optical head 13. In synchronism therewith, the drive circuit 14 is activated by a signal from the CPU 11 so that information is recorded on an information track of the optical card 12 by the modulated light beam from the optical head 13 while the optical card 12 is driven in the direction of the arrow A as shown in Block 2 of FIG. 3B. At the end of the recording operation, the drive circuit 14 backwardly drives the optical card 12 in the direction of the arrow B by a signal from the CPU 11 as shown in Block 4 of FIG. 3B. In synchronism therewith, the optical head 13 reproduces the information which has been recorded on the information track during the forward movement, and the reproduced signal is sent to the compare circuit 17 as shown in Block 5 of FIG. 3B. In synchronism therewith, a signal from the CPU 11 is applied to the memory 16 so that the one track of record signal stored in the memory 16 is forwardly read out and applied to the compare circuit 17. The signal read from the memory 16 and the signal read from the optical head 13 are compared by the compare circuit 17. If the information has been correctly recorded, the signal from the compare circuit 17 is applied to the CPU 11 so that the record signal in the memory 16 is erased by an instruction from the CPU 11 and a new one line of record signal is sent to the memory 16 and stored therein by a signal supplied from the CPU 11 to the main memory means 15 as shown by the logic YES output from Block 6 to Block 7 of FIG. 3B. If the compare circuit 17 detects that the information has not been correctly recorded, the signal from the compare circuit 17 is sent to the CPU 11 and the recording and verification operations are repeated as shown by the logic NO output from Block 6 of FIG. 3B. When the information recording medium is made of an unrewritable medium and an information track has been determined to include information recorded incorrectly, an indicia indicating that the track has the information incorrectly recorded and need not be reproduced in a reproducing mode may be recorded on the recording medium. The indicia may be recorded on an extended line containing no information of an information track on the medium. This is represented in Block 6a of FIG. 3B. Next, the optical head 13 is moved to a different track as shown in Block 6b of FIG. 3B and the process then goes back to Block 2 to repeat the processes in Blocks 2-6. When the recording operation is repeated, on an unrewritable information recording medium, recording will be performed in a track different than the track in which the information has not been substantially recorded.

The relative speed between the optical head 13 and the optical card 12 in the verification operation is higher than the relative speed between the optical head 13 and the optical card 12 in the recording operation, because a light intensity of the optical head 13 in the verification operation may be lower than that in the recording operation. Thus, in the verification operation, the light intensity from the optical head 13 is selected to be lower than that in the recording operation.

The record signal to be applied to the optical head 13 in the recording operation and the record operation to be applied to the compare circuit 17 in the verification operation may be generated by software or hardware.

In FIG. 3A, the optical head 13 may be one of various known devices such as optical disk and compact disk, and detailed explanation thereof is omitted here.

Figure 4A:
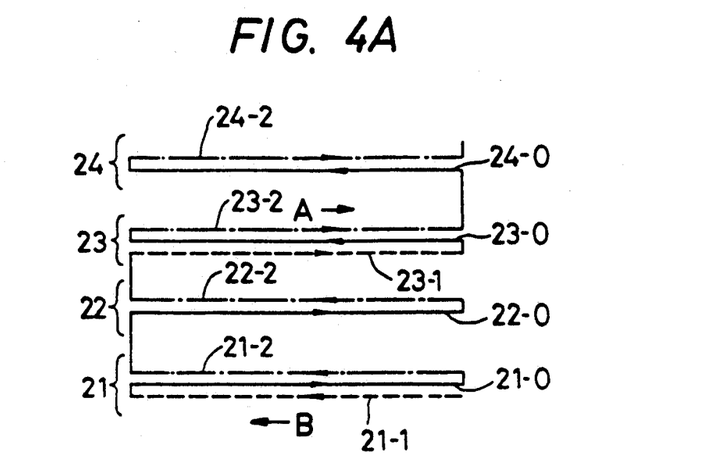
FIGS. 4A, 4B and 4C show another embodiment of the information recording method of the present invention.
Figure 4B:
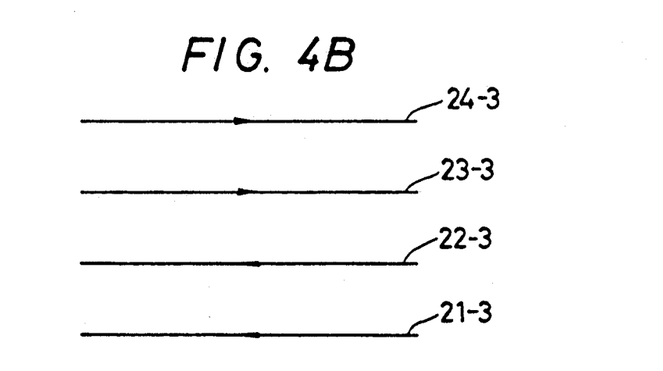
Figure 4C:
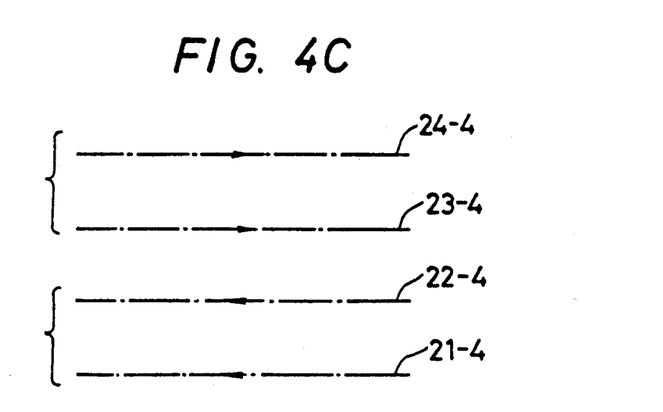

FIGS. 4A, 4B and 4C show another embodiment of the information recording method of the present invention. In the present embodiment, information on two adjacent information tracks are simultaneously reproduced by two independent light beams.

In FIG. 4A, numerals 21, 22, 23 and 24 denote information tracks, numerals 21-0, 22-0, 23-0 and 24-0 denote record paths, numerals 21-1 and 23-1 denote return paths after recording, numerals 21-2, 22-2, 23-2 and 24-2 denotes verification paths, and arrows represent relative movement direction of a head to a recording medium. The record paths, return paths and verification paths are shown separately for a purpose of illustration although they are actually on one line, that is, on an information track. The head is backwardly moved on the information track 21 at the end of the return path 21-1 for the previous track, and in the record path 21-0, the original information is recorded on the information track 21 in the reverse arrangement. At the end of the recording onto the information track 21, the direction of the head movement is again reversed, and in the verification path 21-2, the recorded information is verified and the head is moved to the information track 22.

Then, in the record path 22-0, the original information is recorded on the information track 22 in the reverse arrangement. At the end of the recording operation, the direction of the head movement is reversed. In the verification path 22-2, at the end of the verification operation, the head is moved to the information track 23.

In the subsequent sequences, odd numbered tracks are identical to the track 21, and the even numbered tracks are identical to the track 22. In the odd numbered track, there is the return path but the even numbered track does not need the return path. In any information track, the relative speed between the head and the card in the verification operation is essentially equal to that in the reproducing operation.

FIG. 4B shows arrangement of information recorded on the information tracks. Numerals 21-3, 22-3, 23-3 and 24-3 denote arrangement of information on the information tracks 21 to 24, respectively. They are opposite to the directions of the record paths 21-0 to 24-0 and of the same direction to the verification paths 21-2 to 24-2. As a result, no special process is required in processing the signal produced in the verification operation.

FIG. 4C illustrates simultaneous reading of two tracks. Numerals 21-4, 22-4, 23-4 and 24-4 represent directions of the reproduction paths for the information tracks 21, 22, 23 and 24, respectively. In the reproducing operation, the information tracks 21 and 22 are reproduced in pair, and the information tracks 23 and 24 are reproduced in pair. As seen from FIG. 4C, the directions 21-4 to 24-4 of the reproduction paths in the respective tracks are the same as the arrangement of the information recorded on the information tracks. Accordingly, no special process is required in the reproduction operation.

In the present embodiment, the return path in which no information is processed occurs once for every two tracks. Thus, a total verification time can be reduced over the previous embodiment.

If the relative speed between the head and the recording medium in the verification operation is equal to that in the reproducing operation, a circuit for reproducing the information can be shared.

In the embodiment shown in FIG. 4C, two tracks are simultaneously read and the arrangement of the information is reversed for every two tracks. The larger the number of tracks which are simultaneously read is, the smaller is the number of times of idling movement and the more is the total time for recording and verification reduced. When n tracks are simultaneously read and the arrangement of information is reversed for every n tracks, the idling movement occurs once for every n tracks.

Figure 3C:
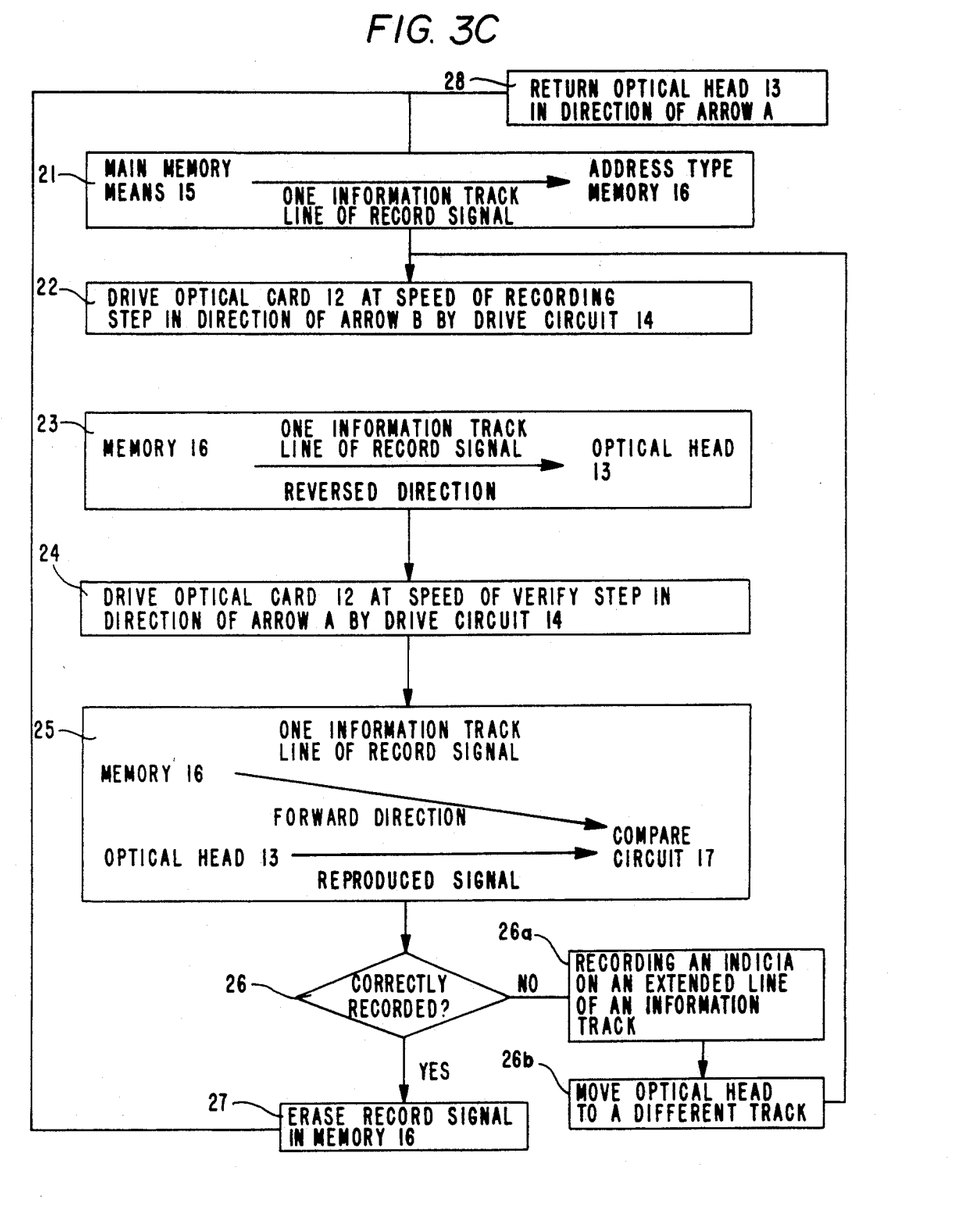
FIG. 3C is a flowchart of the operation of the apparatus and more specifically of CPU 11 with respect to information tracks 23 and 24.

The elements of the apparatus are controlled by CPU 11 in accordance in the process shown in FIG. 3B'. The process outlined in FIG. 3B' as shown in Blocks 11-18 is identical to those in FIG. 3B shown in Blocks 1-7, except that an additional step is shown in Block 18. After the record signal is erased in memory 16 in Block 17, the process returns the optical head 13 in direction of arrow B in FIG. 4A when returning the optical head in information tracks 21 and 22. The CPU 11 also controls the elements of the apparatus to scan information tracks 22 and 23 in accordance with the flow chart as shown in FIG. 3C. This flow chart is identical to FIG. 3B except that in step 28 the optical head 13 is returned in a direction of arrow A as shown in FIG. 4A.

In order to change the speed at which optical card 12 is driven during the verifying step so that it is higher than during the recording step, the CPU 11 supplies the drive circuit 14 with a particular signal. CPU 11 performs this function according to the flowchart in FIG. 3D, which is identical to the flowchart in FIG. 3B except that Block 34 states that the optical card 12 is driven at a speed in the verifying step that is higher than that of the recording step in direction of arrow B by the drive circuit 14.

Figure 5:
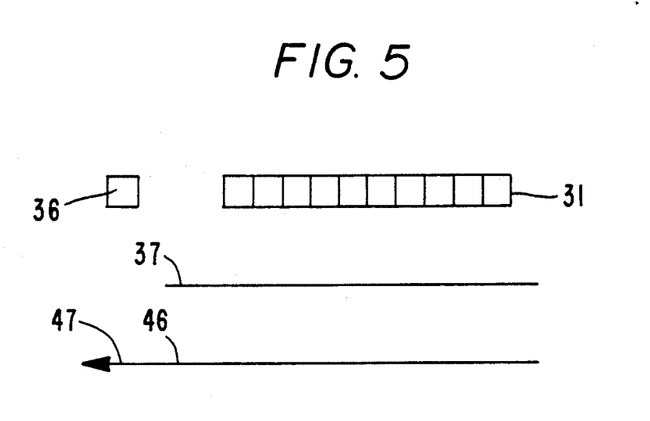
FIG. 5 illustrates an information recording method shown in Box 6a of FIG. 3B in which indicia is recorded on an extended line of the information track.

FIG. 5, shows an explanatory sketch illustrating Box 6a in FIG. 3B, in which element 31, corresponds to element 1 in FIG. 1, and a recorded indicia 36 is recorded on an extended line of an information track 37 along direction 47 in which the head moves. Line 46 represents the distance the head moves along the information track before recording along the extended line.

We claim:

1. An information recording method for recording information stored in a memory on an optical information recording medium having a plurality of tracks by relative reciprocal movement between an optical recording head and the optical information recording medium, comprising the steps of:

recording information on the optical information recording medium, in accordance with first information stored in the memory, by the optical recording head in forward movement thereof relative to the optical information recording medium, the forward movement being in a first direction parallel to an extending direction of the track of the optical information recording medium;

reading the information recorded in the forward movement, in an opposite sequence to the recording sequence in said recording step, in backward movement of the optical recording head relative to the optical information recording medium, the backward movement being in a second direction opposite to the first direction;

verifying if the first information has been substantially correctly recorded in said recording step, based on the information read in said reading step;

recording again per a unit of one track the first information stored in the memory in a track different than the track in which the first information has not been substantially correctly recorded on the optical information recording medium by moving the optical recording head relative to the optical information recording medium and transverse to the track extending direction and then effecting again the forward movement of the optical recording head, in the event that said verifying step detects that the first information has not been substantially correctly recorded;

erasing the first information stored in the memory to store second information in the memory in the event that said verifying step detects that the first information has been substantially correctly recorded;

moving the optical recording head, relative to the optical information recording medium and transverse to the track extending direction, to a second track different than the track in which the first information has been substantially correctly recorded; and repeating the above steps for the second track in accordance with the second information stored in the memory.

2. An information recording method according to claim 1 wherein said verifying comprises comparing the information to be recorded and the information read, bit by bit, to verify if the information has been correctly recorded.

3. An information recording method for recording information on an information recording medium by relative reciprocal movement between a recording head and the information recording medium, comprising the steps of:

recording information on the information recording medium, in accordance with information to be recorded, by the recording head in forward movement thereof relative to the information recording medium;

reading the information recorded in the forward movement, in an opposite sequence to the recording sequence in said recording step, in backward movement of the recording head relative to the information recording medium;

verifying if the information has been substantially correctly recorded in said recording step, based on the information read in said reading step; and recording an indicia on the information recording medium in accordance with a result of said verifying step, the indicia being recorded solely on an extended line of an information track on the recording medium, the information being recorded along the information track, but not on the extended line.

4. An information recording method according to claim 3, wherein said recording step comprises recording the indicia indicating that the information has not been correctly recorded, when said verifying step detects that the information has not been correctly recorded.

* * * * *

UNITED STATES PATENT AND TRADEMARK OFFICE
CERTIFICATE OF CORRECTION

PATENT NO. : 5,247,505

DATED : September 21, 1993

INVENTOR(S) : SATOSHI SHIKICHI, ET AL.

Figure 3D:
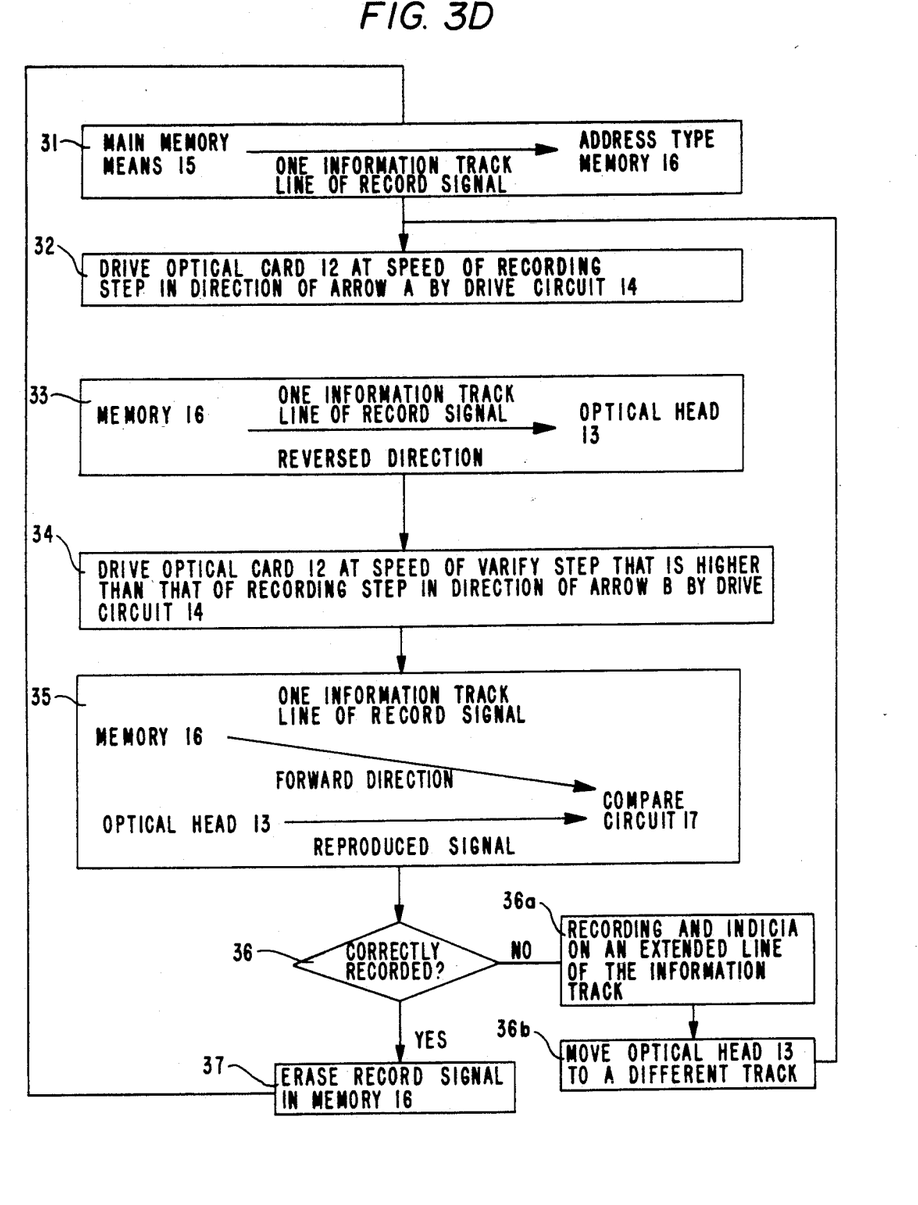
FIG. 3D is a flowchart of the operation of the apparatus and more specifically of CPU 11 which permits the optical card 12 to move at a different speed during the verifying step as compared to the recording step.

It is certified that error appears in the above-identified patent and that said Letters Patent is hereby corrected as shown below:

IN THE DRAWINGS:

<u>SHEET 5 OF 7 OF THE DRAWINGS
    IN FIG. 3D</u>

In box 34, "VARIFY" should read --VERIFY--.

<u>COLUMN 5</u>

Line 8, "denotes" should read --denote--.

<u>COLUMN 7</u>

Line 22, "claim 1" should read --claim 1,--; and "verifying" should read --verifying step--.

Signed and Sealed this

Twenty-sixth Day of April, 1994

Attest:

BRUCE LEHMAN

*Attesting Officer*  *Commissioner of Patents and Trademarks*